United States Patent [19]
Abe et al.

[11] Patent Number: 6,134,378
[45] Date of Patent: Oct. 17, 2000

[54] VIDEO SIGNAL PROCESSING DEVICE THAT FACILITATES EDITING BY PRODUCING CONTROL INFORMATION FROM DETECTED VIDEO SIGNAL INFORMATION

[75] Inventors: Keiko Abe, Kanagawa; Koji Yanase, Tokyo, both of Japan

[73] Assignee: Sony Corporation, Tokyo, Japan

[21] Appl. No.: 09/204,462

[22] Filed: Dec. 3, 1998

Related U.S. Application Data

[63] Continuation of application No. PCT/JP98/01561, Apr. 3, 1998.

[30] Foreign Application Priority Data

Apr. 6, 1997 [JP] Japan ..................................... 9-103843

[51] Int. Cl.[7] ............................... H04N 5/76; H04N 5/92
[52] U.S. Cl. .................................. 386/52; 386/55; 386/65
[58] Field of Search .................................. 386/4, 52, 55, 386/60, 64–65; 345/328; 360/13; 369/83; H04N 5/76, 9/79

[56] References Cited

U.S. PATENT DOCUMENTS

| | | |
|---|---|---|
| 4,422,171 | 12/1983 | Wortley et al. ........................... 371/32 |
| 4,685,003 | 8/1987 | Westland ................................... 360/31 |
| 4,772,966 | 9/1988 | Sharples et al. .......................... 360/13 |
| 4,791,643 | 12/1988 | Molstad et al. .......................... 371/40 |
| 5,146,448 | 9/1992 | Adachi et al. ............................ 360/13 |
| 5,267,351 | 11/1993 | Reber et al. .............................. 360/13 |
| 5,402,275 | 3/1995 | Nishido ..................................... 360/13 |
| 5,706,260 | 1/1998 | Kishi et al. ............................... 360/48 |
| 5,819,004 | 10/1998 | Azadegan et al. ....................... 386/112 |

*Primary Examiner*—Thai Tran
*Attorney, Agent, or Firm*—Frommer Lawrence & Haug, LLP.; William S. Frommer

[57] ABSTRACT

In the video signal processing device which records video signal (D60) as the material by the predetermined recording reproducing means (64) and conducts the desired editing processing upon reading out the video signal recorded in said recording reproducing means, the detection means (61) for detecting the material information (D72) added to the video signal in the case of recording the video signal by the recording reproducing means and for forming the predetermined control information (D62) based on said material information, and the memory means (35) for storing the control information formed by the detection means are provided. And thus, even if the operator would not enter the control information, it can be easily set and the editing processing based on this control information can be conducted. And thereby, the video signal processing device having further improved usability can be realized.

7 Claims, 11 Drawing Sheets

| BLOCK NUMBER | DATA OF PHOTO SHOOTING | MODEL NAME | SERIAL NUMBER | CASSETTE NUMBER | PLACE OF PHOTO SHOOTING |
|---|---|---|---|---|---|
| 1 | 970311 | ○×△□ | 123456 | 12 | ○×△ |
| 2 | 970311 | ○×△△ | 123457 | 10 | ○×△ |
| 3 | 970311 | △△×× | 123458 | 11 | ○×△ |
| 4 | 970311 | △△×× | 123459 | 9 | ○×△ |
| 5 | 970311 | ○×△□ | 123460 | 9 | ○×△ |
| 6 | 970311 | ○×△□ | 123461 | 8 | ○×△ |

INDEX TABLE

FIG. 5A

| BLOCK NUMBER | VITC |
|---|---|
| 1 | 00:07:30:00 |
| 2 | 00:08:00:00 |
| 2 | 00:09:00:00 |
| 3 | 00:10:00:00 |
| 4 | 00:09:00:00 |
| 4 | 00:10:00:00 |
| 5 | 00:11:00:00 |
| 6 | 00:16:00:00 |

GOOD SHOT MARK TABLE

FIG. 5B

| BLOCK NUMBER | STC | FTC | S-VITC | E-VITC | Dur |
|---|---|---|---|---|---|
| 1 | 01:00:00:00 | 00:00:00:00 | 00:05:00:00 | 00:10:00:00 | 00:05:00:00 |
| 2 | 01:00:00:00 | 00:05:00:00 | 00:07:00:00 | 00:14:00:00 | 00:07:00:00 |
| 3 | 01:00:00:00 | 00:12:00:00 | 00:05:30:00 | 00:11:00:00 | 00:05:30:00 |
| 4 | 01:00:00:00 | 00:17:30:00 | 00:06:00:00 | 00:12:00:00 | 00:06:00:00 |
| 5 | 01:00:00:00 | 00:23:30:00 | 00:05:00:00 | 00:12:00:00 | 00:07:00:00 |
| 6 | 01:00:00:00 | 00:30:30:00 | 00:10:00:00 | 00:18:00:00 | 00:08:00:00 |

FIG. 6

VIDEO SIGNAL PROCESSING DEVICE THAT FACILITATES EDITING BY PRODUCING CONTROL INFORMATION FROM DETECTED VIDEO SIGNAL INFORMATION

This is a continuation of copending International Application PCT/JP98/01561 having an international filing date of Apr. 3, 1998.

FIELD OF THE INVENTION

The present invention relates to a video signal processing device and is suitably applied to a news program production broadcasting system for downloading audio/video signal collected on the field of collecting material for an article in a server device of the broadcasting station and forming audio/video signal for broadcasting (hereinafter referred to as a program) upon editing various types of video materials and audio materials recorded in the server device.

DESCRIPTION OF THE PRIOR ART

Heretofore, in the case of producing news programs in the broadcasting station, for example, firstly by shooting photos on the field of incident using a camera built-in video tape recorder (hereinafter referred to as camcorder) and by transmitting the resulting audio/video signal to the broadcasting station via a predetermined communication circuit, the audio/video signal is recorded on a server device installed in the broadcasting station as recording and reproducing means (or the video tape is carried back to the broadcasting station and audio/video signal collected is recorded on the server device). Then, the desired material is read out from various video materials and audio materials stored in t his server device and the editing processing will be conducted by combining these or adding such as narration, and program will be produced.

In recent years as the server device described above, the server device using a nonlinear medium which is randomly accessible such as a hard disc has been widely used, as opposed to a linear recording medium such as video tape. This type of server device, in the case of recording audio/video signals transmitted or audio/video signals stored on the video tape in the internal recording medium, combines related audio/video signals into one file respectively and records. In this case, the server device does not record the signal using time codes added by the camcorder when shooting photo but by allocating new time codes to each audio/video signal, it records audio/video signals in order that time codes of audio/video signals to be stored in one file will be continuous. Thus, in this type of server device, even in the case where the audio/video signals collected at the same time are combined into one file and recorded, duplication of time codes in the file can be prevented and audio/video signals can be controlled according to time codes.

Here, the time code newly assigned by the server device is comprised of a time code showing the head of file, and is called a start time code (hereinafter referred to merely as STC) and a time code showing relative position from the head of file is called a file time code (hereinafter referred to as FTC). In this case, as the STC, an optional value can be set by the user, but generally the time code value by which the recording start time to the server device can be known is used. Furthermore, as FTC, zero is set at the recording start time and every time a frame of the audio/video signal to be recorded changes, the value of time code sequentially counted up will be used. Accordingly, when accessing to the frame of the desired audio/video signal out of audio/video signals combined and recorded in the file, if these STC and FTC would be shown to the server device, the frame of audio/video signal specified based on these STC and FTC can be read out.

However, in a news program production broadcasting system, in the case of editing programs using various types of video materials and audio materials stored in the server device, since the time code newly assigned by the server device should be specified and the desired material should be read out, it causes the inconvenience in operability. Since there are many cases where the editing operator wants to use the material photographed approximately at "○○: ΔΔ(time)" in the program, if the material can be read out by specifying the time code showing the real time added by the camcorder when it is photographed, it is considered that the editing work can be conducted more easily.

Furthermore, in a recent camcorder, if the photographer conducts the predetermined operation when a good material that can be used in the program is photographed, a mark indicating that is a good material usable in the program, that is a good shot mark can be recorded on the video tape. However, since this good shot mark recorded on the video tape cannot be detected in the news program production broadcasting system as described above, the editing work which makes this good shot mark as a guide cannot be conducted and this causes the inconvenience because of poor operability on this point.

Furthermore, in the recent camcorder, the information such as the name of manufacturer of the camcorder and its model name, serial number assigned to the camcorder (such as manufacture number), the date and time of photo shooting, the cassette number added on the video tape, can be recorded on the video tape when shooting photo as an index data. However, since the index data recorded cannot be detected in the news program production broadcasting system as described above, the operator must reenter these index data when downloading the server device, this causes inconvenience due to poor operability on this point.

DISCLOSURE OF THE INVENTION

The present invention has been conceived considering the above points and is proposing a video signal processing device having further improved ease of use.

To obviate such problems according to the present invention, in the video signal processing device for recording the video signal as the material by the predetermined recording/reproducing means and for reading out the video signal recorded in said recording and reproducing means and applying the desired editing processing, detecting means for detecting the material information added to the video signal in the case of recording the video signal by the recording/ reproducing means and forming the predetermined control information based on said material information and memory means for memorizing the control information formed by the detecting means are provided.

According to the present invention, in the case of recording the video signal by the recording/reproducing means, since the material information added to said video signal is detected and the predetermined control information is formed and said control information will be memorized, the control information can be easily set without the operator's entering it and the editing processing based on said control information can be conducted, and thereby the video signal processing device having further improved operability can be realized.

BRIEF DESCRIPTION OF DRAWINGS

FIG. 5 (A) and (B) are tables showing the image index information.

FIG. 6 is a table showing the time code management table.

DESCRIPTION OF THE PREFERRED EMBODIMENTS

An embodiment of the present invention will be described in detail with reference to the accompanying drawings.

(1) CONSTRUCTION OF NEWS PROGRAM PRODUCTION BROADCASTING SYSTEM ACCORDING TO THE PRESENT EMBODIMENT

Figure 1:
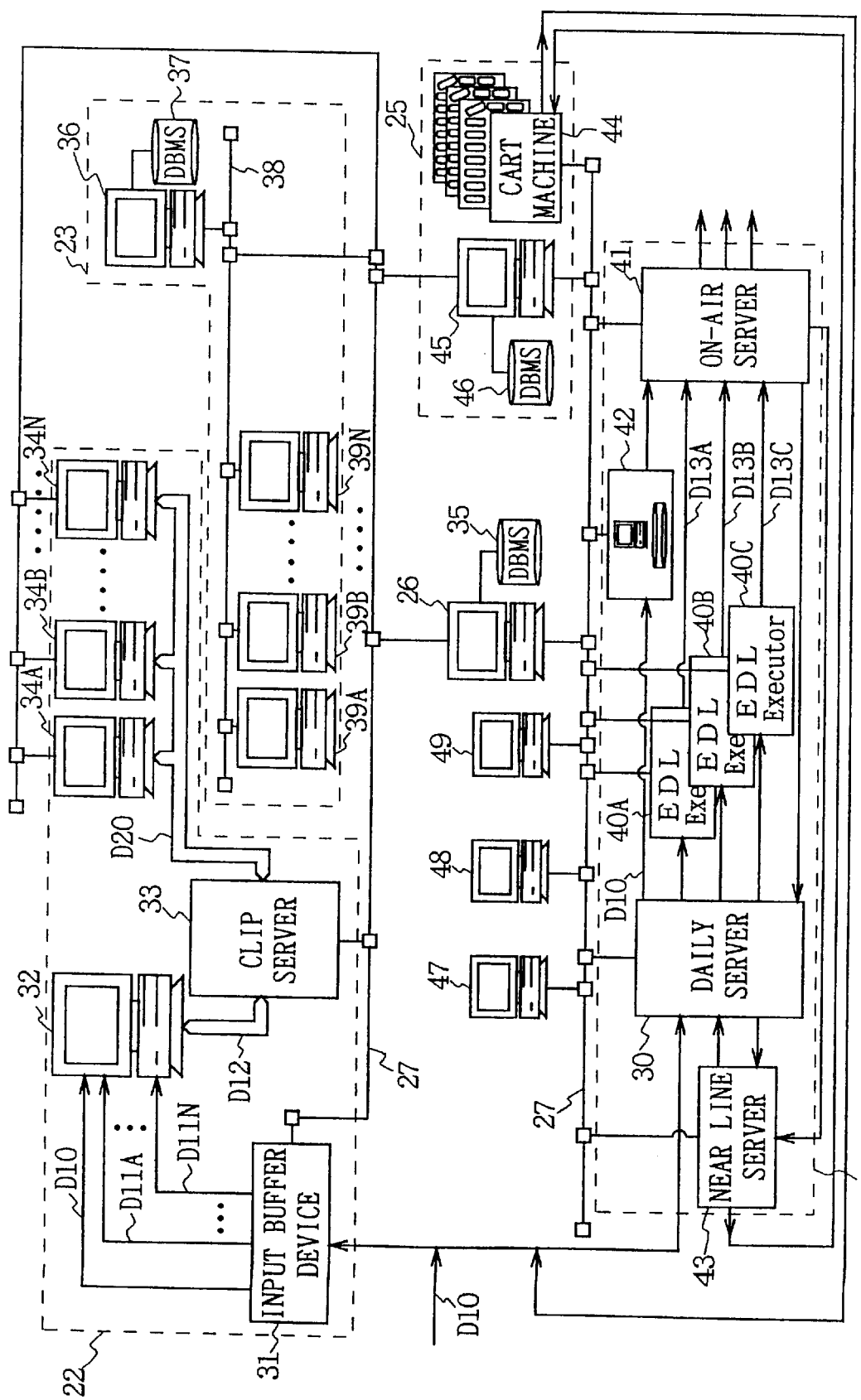
FIG. 1 is a block diagram showing the construction of a news program production broadcasting system according to one embodiment of the present invention.

In FIG. 1, 20 generally shows a news program production broadcasting system according to the present invention, and this system is comprised of an off-line edit decision list forming system 22 so that the operator can make a list in which the editing content is specified, such as how the audio/video data obtained by collecting material on the field would be edited (hereinafter referred to as EDL (edit decision list)), an on-air list forming system 23 so that the operator can make a list in which broadcasting time of each edited audio/video data is specified (hereinafter referred to as on-air list) and news drafts and the order of usage of said news drafts, an on-line editing output system 24 for executing the editing processing based on the EDL formed at the off-line EDL forming system 23, an archive 25 for storing the necessary audio/video data, and a system control unit 26 to control the overall news program production broadcasting system 20; and these off-line EDL forming system 22, on-air list forming system 23, on-line editing output system 24, archive 25 and system control unit 26 are connected via LAN (Local Area Network) 27.

In this case, in this news program production broadcasting system 20, the audio/video data D10 will be supplied from multiple sources via telephone line from the field of material collecting, or satellite communications circuit, or reproduced by the video tape recorder from the material tape, and these are supplied into a daily server 30 of the on-line editing output system 24 and an input buffer device 31 of the off-line EDL forming system 22. Provided that in the following explanations each item of audio/video data D10 will be supplied in the non-compressed or low-compressed condition (compression by such as MPEG (moving picture experts group)2 422 profile at main level standard).

The daily server 30 is comprised of a recording/reproducing unit formed of disk arrays and an AV server having an exclusive data compression/expanding unit represented by such as MPEG2 and it simultaneously captures multiple systems of audio/video data D10 specified from among audio/video data D10 to be supplied under the control of control unit 26 and put them into file and stores in the address position specified in the recording/reproducing unit.

On the other hand, the input buffer device 31 sequentially captures audio/video data D10 of the same system as the daily server 30 from the audio/video data D10 supplied under the control of the system control unit 26. Then, if the audio/video data D10 captured is non-compressed or low-compressed and its transmission rate is the real time first data rate, the input buffer device 31 outputs said audio/video data D10 to an encoder unit 32 as is.

On the other hand, in the case where the audio/video data D10 captured is low compressed and its transmission rate is higher than the first data rate, that is the second data rate, the input buffer device 31 time-shares said audio/video data D10 to multiple channels and simultaneously expands the audio/video data D10 of each channel to real time (the first data rate) respectively, and transmits the resultant audio/video data D11A–D11N of each channel to the encoder unit 32 respectively.

The encoder unit 32 successively captures the audio/video data D10 to be supplied or each audio/video data D11 and conducts highly efficient compression encoding on these with the predetermined compression system such as JPEG (Joint Photographic Experts Group) system to approximately 2 (Mbps) and transmits the resultant highly compression coded data D12 to a clip server 33.

The clip server 33 comprises a recording/reproducing unit formed of disk arrays and an AV server having no data compression expansion unit, and it successively captures high compression encoded data D12 to be entered under the control of the system control unit 26 and putting these in the file stores on the specified address position in the recording/reproduction unit.

The data of each file stored in this clip server 33 (high compression encoded data D12) can be read out by using multiple numbers of EDL forming devices 34A–34N connected to said clip server 33 respectively.

In practice, at the time of EDL forming mode, each EDL forming device 34A–34N, when the command to read out the desired file is entered by the operator, accesses to the system control unit 26 through the clip server 33 and the LAN 27, and by controlling the clip server 33 via said system control unit 26 can make the high compression encoded data D12 of the file corresponding to said clip server 33 to be successively read out.

Furthermore, each of the EDL forming devices 34A–34N decodes the high compression encoded data D20 read out from this clip server 33 and displays the image on the monitor based on the resulting audio/video data.

At this point, the operator, controlling the clip server 33 through EDL forming device 34A–34N, can make the clip server 33 to execute the desired operation (reproduction, rewind or fast forward). Moreover, at this point, the operator visually confirming images displayed on the monitor of said EDL forming devices 34A–34N, enters various information required for editing in-points and out-points and can form the EDL.

Furthermore, each EDL forming device 34A–34N, reading out the high compression encoded data D20 from the clip server 33 based on the EDL formed and decodes this and edits the audio/video data obtained based on the EDL and can display the edited result on the monitor, and thus, the edited result based on the EDL formed can be confirmed by the operator and the director.

The EDL data formed using EDL forming devices 34A–34N (hereinafter referred to as EDL) will be transmitted from said EDL forming devices 34A–34N to the system control unit 26 successively through the clip server 33 and LAN 27 and registered on an external memory device 35 as a database under the control of said system control unit 26.

On the other hand, the on-air list forming system 23 comprises a database management device 36 formed of personal computers, an external memory device 37, and multiple personal computers 39A–39N connected to the database management device 36 via the network 38, and in utilizing these personal computers 39A–39N the on-air list and drafts of each news item in each news program to be read by the announcer can be formed.

Each data of the on-air list and draft will be registered in a database in the internal memory device 37 under the control of database management device 36 and simultaneously, data of the on-air list (hereinafter referred to as on-air list data) will be supplied to the system control unit 26 via the LAN 27 and registered in the external memory device 35 as the database.

Moreover, the system control unit 26 controls the on-line editing transmission system 24 based on the EDL data and the on-air list data registered in the external memory unit 35.

In practice, the system control unit 26 constantly monitors operating condition of the EDL execution device 40A–40C formed of multiple automatic editing execution devices connected to the daily server 30 of the on-line editing transmission system 24, and when either one of EDL execution devices 40A–40C finishes the preceding editing processing to be described later, the system control unit 26 reads out the EDL data stored in the external memory device 35 in order of precedence starting from the data to be put on air earlier based on the on-air list data and transmits this to the EDL execution devices 40A–40C via the LAN 27.

The EDL execution devices 40A–40C control the daily server 30 based on the EDL data to be supplied from the system control unit 26, and cause this daily server 30 to read out the necessary audio/video data D10 from among the non-compressed or low compressed audio/video data D10 stored in said daily server 30 successively. Moreover, in the case where the audio/video data D10 is low compressed, after decoding this, the EDL execution devices 40A–40C edit this audio/video data D10 to the specified condition based on the EDL data supplied and transmits the resultant audio/video data D13A–D13C to the on-air server 41 respectively.

In this connection, a manually operated editing device 42 is also connected to the daily server 30, and the operator can read out audio/video data D10 stored in the daily server 30 using said editing device 42 and can edit this. And the resultant edited audio/video data D13 will be transmitted to the on-air server 41. The on-air server 41 is comprised of AV server having a recording/reproducing unit formed of disk array and successively captures audio/video data D13A–D13D to be entered under the control of the system control unit 26, and set up a file and stores this on the address position specified in the recording/reproducing unit.

Then, the broadcasting time of each file data (audio/video D13A–D13D edited) is controlled by the on-air terminal 49 formed of personal computer connected to the LAN 27 based on the on-air list data stored in the external memory device 35, and when the specified time comes, the file data will be read out from the on-air server 41 under the control of the system control unit 26 and transmitted to the on-air device of the later stage (not shown in FIG. 1).

With this arrangement, in the news program production broadcasting system 20, the editing processing can be executed in utilizing the non-compressed or low-compressed audio/video D10 in the on-line editing transmission system 24 based on the EDL formed in the off-line EDL forming system 22, and the resultant audio/video data D13A–D13D can be transmitted to the on-air device based on the on-air list data, and thus, the news video and audio edited to the specified condition can be broadcasted at the specified time.

In addition to the above, in the case of this news program production broadcasting system 20, a near line server 43 comprising an AV server having a recording/reproducing unit such as MO (magneto optical) changer which is inexpensive and having large capacity is provided, and the audio/video data D10, D13A–D13D stored in the daily server 30 and the on-air server 41 will be transmitted to the near line server 43 under the control of the system control unit 26 and these can be stored in said near line server 43.

Furthermore, audio/video data D10, D13A–D13D stored in the near line server 43 will be transmitted to the daily server 30 under the control of the system control unit 26 and can be stored in said daily server 30, and thereby, the memory capacity of the input stage of the on-line editing transmission system 24 can be increased without increasing the memory capacity of the recording/reproducing unit of the daily server 30 formed of expensive disk arrays.

Furthermore, the near line server 43 is connected to the cart machine 44 in the archive 25 via a predetermined interface such as SCSI (small computer system interface) and transmits the audio/video data D10, D13A–D13D in the near line server 43 to the cart machine 44 in the archive 25 under the control of the system control unit 26 and can record said audio/video data D10, D13A–D13D on the predetermined recording medium via this cart machine 44. Thus, in this news program production broadcasting system 20, the necessary audio/video data can be stored as material.

At this point, various kinds of management data regarding the content of these audio/video data D10, D13A–D13D will be supplied into the database management device 45 formed of personal computers provided in this archive 25 from the system control unit 26 via the LAN 27. And under the control of database management device 45, these various management data are supplied to the external memory device 46 and stored as a database.

Furthermore, at this point, under the control of the system control unit 26, draft data corresponding to the audio/video data can be transmitted to the database management device 45 of the archive 25 from the database management device 36 of the on-air list forming system 23 via the LAN 27, and this can be registered on the database in the external memory device 46 under the control of the database management device 45.

Moreover, audio/video data D10, D13A–D13D registered on the recording medium such as magnetic tape stored in the archive 25 will be reproduced by the cart machine 44 and can be transmitted to the input buffer device 31 of the off-line EDL forming system and the daily server 30 of the on-line editing transmitting system 24, and thus, the stored audio/video data D10, D13A–D13D can be utilized again in editing.

In the case of this news program production broadcasting system 20, the LAN 27 is connected with the filing terminal 47 formed of personal computer and using this filing terminal 47, the audio/video data D10 to be captured in the input buffer 31 and the daily server 30 can be specified, and the file name of said specified audio/video data D10 can be entered, and the content of the audio/video data D10 stored in the daily server 30 can be confirmed.

Furthermore, in the case of this news program production broadcasting system 20, the LAN 27 is also connected with the EDL preview terminal 48 formed of personal computer, and the EDL data stored in the external memory device 85 can be read out in utilizing said EDL preview terminal 48, and making either one of EDL executing devices 40A–40C to execute editing based on said EDL data and can display the resultant on the monitor (not shown in Fig.) connected to that EDL executing devices 40A–40C and can put it out from the speaker.

Furthermore, in the case of this news program production broadcasting system 20, the desired file data (edited audio/video data D13A–D13D) stored in the on-air server 41 will be read out by using the on-air terminal 49 and images and audio based on said file data can be displayed on the monitor (not shown in Fig.) connected to the on-air server 41 and outputted from the speaker. And thereby, the operator can confirm the edited news image to be broadcasted before it is put on the air.

(2) CONSTRUCTION OF DAILY SERVER

In this chapter the daily server 30 for recording audio/video data will be described. The daily server 30 is a data storing means and records audio/video data obtained by reproducing the audio/video data transmitted via the predetermined communication circuit from the field of collecting material and the video tape brought back from the field of article gathering. In this news program production broadcasting system 20, by reading out and editing various types of video materials and audio materials recorded in this daily server 30, the program for broadcasting will be produced.

Figure 2:
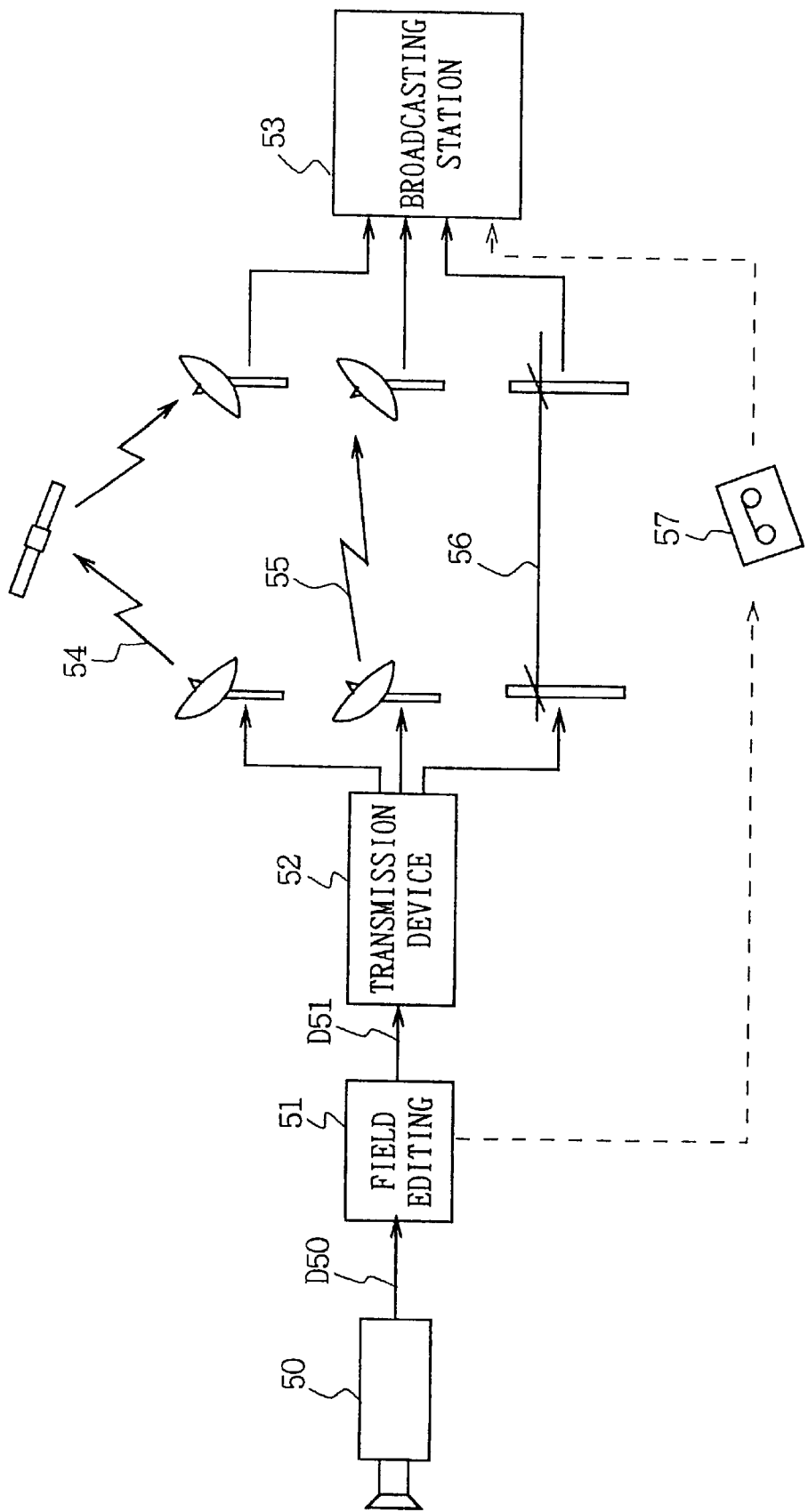
FIG. 2 is a block diagram illustrating the flow of audio/video data to reach the broadcasting station.

At this point, before explaining the construction of the daily server 30, we will explain the audio/video data to be recorded in said daily server 30 referring to FIG. 2. Firstly, on the field of collecting materials, by photographing objects to become news material, such as scenery and figures, using the camcorder 50, video data will be formed and this will be recorded on the video tape in the camcorder 50. At this point, voice of the figure will be collected if necessary and the resultant audio data will be recorded on the video tape with video data. Also, at this point, the camcorder 50 records upon adding time code per each frame to the video data as an information on the material (hereinafter referred to as material information). There are 2 types of time code; one is the time code that is inserted into vertical synchronous period and recorded, that is called as VITC (vertical interval time code), and the other is the time code called as LTC (long time code) that is recorded on the time code track formed in the longitudinal direction of the video tape. However, these time codes differ only in recording format, and the time codes having the same value will be recorded to the same frame of the image data. In this connection, these VITC time code and LTC time code show real time at the time of recording and in the following paragraphs these will be referred as real time code.

Furthermore, in the case of recording video data, the camcorder 50 automatically records index data such as the date of photo shooting, the model name of camcorder, serial number (e.g., manufacture number assigned to the camcorder 50) on the video tape as material data. Moreover, if the cameraman conducts the predetermined operation, the camcorder 50 records the name of cameraman, cassette number assigned to the video tape, the location of photo shooting on the video tape as material data. In this connection, these index data will be recorded in the user area set in the vertical synchronous period of video data. We will explain in the following chapters assuming that these index data are added to the audio/video data D50 to be put out from the camcorder 50 as material data.

Furthermore, the camcorder 50 can also record the data of 'good shot mark' showing that is a good material usable in the broadcasting program, and when the cameraman conducts the predetermined operation, the data of 'good shot mark' will be recorded on the frame at that moment. In this connection, this good shot mark will be recorded in the user area set in the vertical synchronous period of the video data, and the data of said good shot mark will be recorded in the user area of the frame at the time when the cameraman conducts the predetermined operation. In this connection, in the following chapters we will explain assuming that the data of this good shot mark is added to the audio/video data D50 to be outputted from the camcorder 50 as material data.

Thus formed audio/video data D50 by the camcorder 50 will be reproduced from the video tape and supplied to the field editing machine 51. The field editing machine 51 is an editing equipment for conducting simple editing work such as combining various audio/video data D50 collected on the field into one file, and combines several audio/video data D50 to be supplied from the camcorder 50 into one data stream responding to the operator's operation and outputs the resultant audio/video data D51 to the transmission device 52. In the following explanations a sequence of audio/video data D50 before being combined into one data stream will be referred to as block.

The transmission device 52 is a device to transmit the audio video data D51 formed on the field of collecting material to the broadcasting station 53, and transmits said audio video data D51 to the broadcasting station via a communication circuit 54 by satellite wave, a communication circuit 55 by terrestrial wave, or a telephone circuit 56. In this connection, the audio/video data D51 would not be transmitted via the transmission device 52, but in some cases the audio/video data D51 could be recorded on the video tape 57 in the field editing machine 51 and by carrying back this video tape 57 to the broadcasting station, the audio video data D51 will be transmitted. And the audio video data D51 thus brought to the broadcasting station 53 will be recorded in the daily server 30 as described above.

Figure 3:
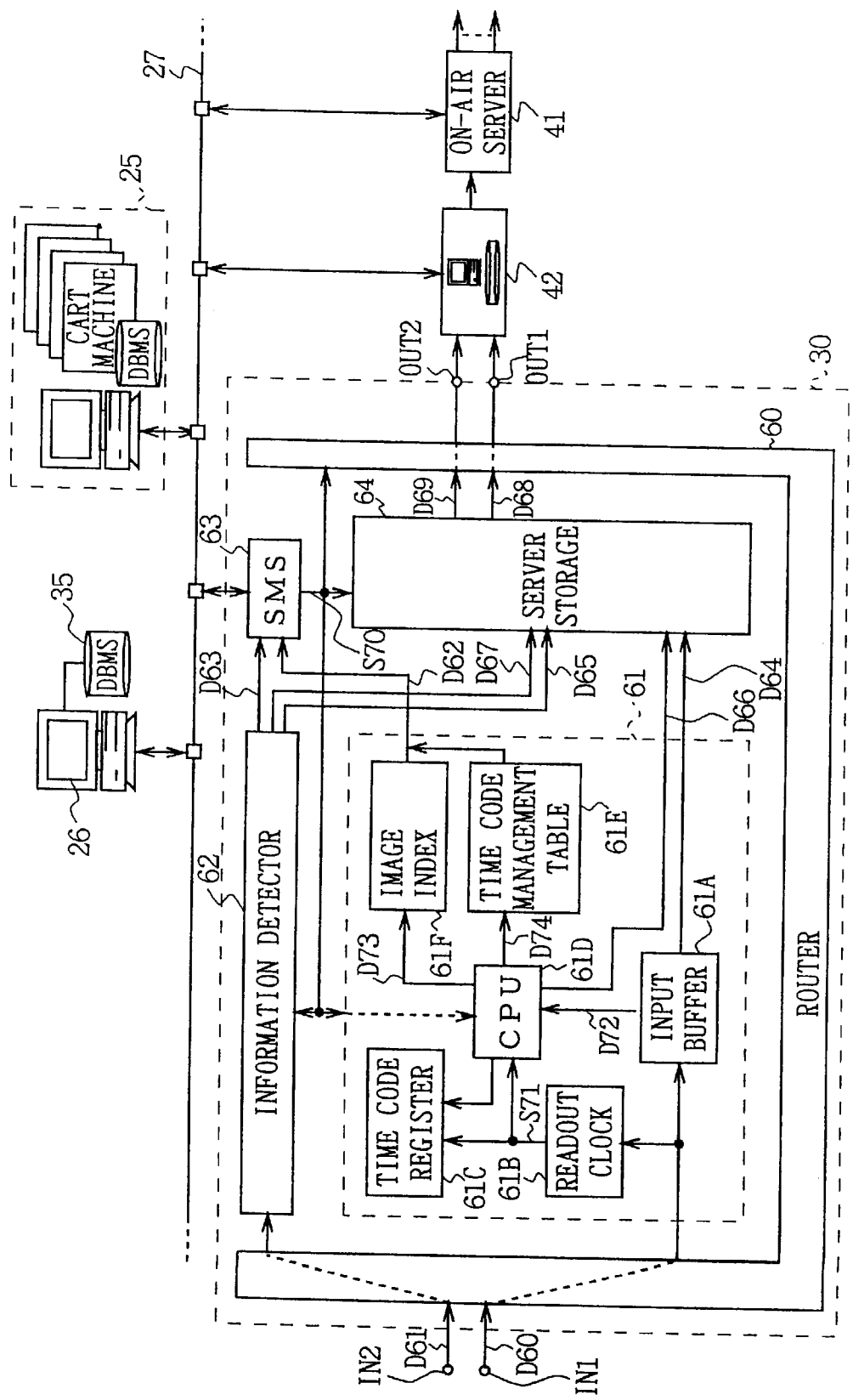
FIG. 3 is a block diagram showing the construction of a daily server.

Then, referring to FIG. 3 in which parts corresponding to those in FIG. 1 are designated the same reference numerals, the construction of the daily server 30 will be described. 30 generally shows the daily server and is mainly comprised of a router 60, the first and the second information detectors 61, 62, a server management system (SMS) 63, and a server storage 64. In practice this daily server 30 comprises two input ports IN1 and IN2 and two output ports OUT1, OUT2, and receives audio/video data D60, D61 transmitted to the broadcasting station by means described above through said input ports IN1, IN2 and inputs these to the internal router 60.

The router 60 is a signal route switching means comprising multiple internal signal routes, and of said multiple signal routes by selecting the desired signal route, it supplies the input audio/video data D60 to the first information detector 61 and supplies the audio/video data D61 to the second information detector 62.

The first information detector 61, as well as detecting image index information from the input audio/video data D60, forms a table on which real time code added to the video/audio data D60 and time code newly assigned to said audio/video data D60 for management when recording (hereinafter referred to as server record time code) are tabulated, and sends out the image index information detected and the time code formed to the server management system 63 as a file information D62. Moreover, the first information detector 61 transmits the input audio/video data D60 to a server storage 64 as an audio/video data D64 and simultaneously transmits a newly assigned server recording time code D66 to the server storage 64.

Similarly, the second information detector 62, as well as detecting image index information from the input audio/video data D61, forms a table on which real time code added to the audio/video data D61 and server record time code newly assigned to said audio/video data D61 for management when recording the real time code are tabulated, and transmits the detected image index information and the time code table formed to the server management system 63 as the file information D63. Furthermore, the second information detector 61, as well as transmitting the input audio/video data D61 to the server storage 64 as audio/video data D65, transmits the server recording time code D67 newly assigned to the server storage 64. In this connection, newly assign the time code means that to manage each frame of audio/video data by the newly assigned server recording time code not managing each frame of audio video data by the real time code added when recorded by the camcorder and does not mean to rewrite the real time code added when recorded by the camcorder to the server record time code.

Furthermore, as described above, the audio/video data D60 and D61 are comprised of a data stream consisting of several mutually related audio/video data blocks combined respectively, and in this daily server 30, since the audio/video data D60 and D61 in a string of several audio/video data blocks will be recorded as the file respectively, the server recording time code to be newly assigned is formed of start time code (STC) showing the head of file, and file time code (FTC) showing the relative position from the file head. Accordingly, in this daily server 30, by newly assigning these server record time codes, even in the case of recording the audio/video data collected at the same time into one file combined, duplication of time codes in the file can be prevented and the audio/video data management by the time code can be conducted.

The server storage 64 is a recording reproduction unit having a recording medium comprising an array of multiple hard disks for example, and gradually records said audio/video data D64 and D65 controlling the audio video data D64 and D65 in the desired area of the recording medium by using the newly assigned server record time codes D66 and D67. More specifically, the server storage 64 keeps track of address of the area in which the audio/video data D64 is recorded relating to the time code of the audio/video data D64 to be written in the area of that recording address (in this case newly assigned server record time code D66) and records the audio/video data D64 on the recording medium according to that relationship. Thus, in the case of recording, if the newly assigned server recording time code is specified, the recording address would be detected referring to that relationship and the specified audio/video data D64 can be reproduced.

Similarly, the server storage 64 keeps track of address of the area on which the audio video data D65 is recorded and the time code of the audio video data to be written in that recording address area (in this case, the newly assigned server record time code D67) and records the audio video data D65 on the recording medium according to that relationship. Thus, at the time of reproduction, if the newly assigned server recording time code is specified, referring to that relationship the record address is detected and specified audio video data D65 can be reproduced. These audio video data D64 and D65 reproduced from the server storage 64 will be transmitted to such as the manually operated editing device 42 via the router 60, output ports OUT1 and OUT2 respectively as the audio video data D68 and D69. Moreover, the server storage 64 comprises a data compression expanding unit and can provide the predetermined compression processing when recording audio video data D64 and D65 if required and can expand these at the time of reproduction.

The server management system 63 is a control means for controlling the overall operation of this daily server 30 and outputting control signal S70, controls operations of the router 60, the first and the second information detectors 61 and 62, and the server storage 64. For example, it specifies the signal path to select to the router 60, and to the first and the second information detector 61 and 62, it specifies the detection of image index information and the formation of a time code table. Moreover, to the server storage 64, it specifies the recording and reproduction of audio video data D64 and D65. Furthermore, the server management system 63 transmits the image index information and the file information D62, D63, formed of time code table received from the first and the second information detector 61 and 62 to the system control unit 26 via the LAN 27 and thus, it can store said file information D62, D63 in the external memory device 35 connected to the system control unit 26 as a database.

At this point, the first and the second information detectors 61 and 62 described above will be explained more concretely. Provided that since the first and the second information detectors have the same construction, only the first information detector 61 will be described below. Firstly, the first information detector 61 is comprised of an input buffer 61A, a readout clock generator 61B, a time code register 61C, a CPU (central processing unit) 61D, a time code management table storing unit 61E and an image index storing unit 61F, and enters the audio video data D60 supplied and the input buffer 61A to the readout clock generator 61B.

The input buffer 61A is comprised of such as a memory and successively stores the audio video data D60 to be supplied in the internal memory area. Then, the input buffer 61 reads out the audio video data D60 synchronizing with the server record time code D66 newly assigned at the CPU 61D as will be discussed later and outputs this to the server storage 64 as the audio video data D64. On the other hand, the readout clock generator 61B generates a clock signal S71 showing the frame timing of said audio video data D60 based on the audio video data D60 to be supplied and outputs this to the time code register 61C and the CPU 61D.

The CPU 61D is a control circuit to control the overall operation of this information detector 61. This CPU 61D reads out material information D72 successively from the audio video data D60 stored in said input buffer 61A by addressing to the input buffer 61A. In this case, as the material information D72 to be read out, the VITC time code inserted in the vertical synchronous period of the video data, the index data such as the date of photo shooting, the model name, or the cassette number and the location of photo shooting and the data of good shot mark stored in the user area of the vertical synchronous period of video data are included.

Of the data read out from the input buffer 61A, the CPU 61D stores the data stored in the user area (i.e., the index data such as the data when photographed and the model name and the good shot mark data) in the image index storing unit 61F as an image index information D73. In this case, the CPU 61D forms an image index table arranging data per block of the audio video data D60 respectively and stores this in the image index storing unit 61F as the image index information D73.

Furthermore, the CPU 61, as well as storing VITC time code added to the head frame of the audio video data D60 obtained by reading out the data from the input buffer 61A in the time code register 61C as the VITC time code showing the head of block, sets this in the internal time code counter. And the CPU 61D successively increments the value of the time code counter based on the clock signal S71 from the readout clock generator 61B (i.e., increases the value of time code one by one in synchronism with the clock signal S71), and by comparing the incremented value of time code and the value of VITC time code of the audio video data D60 read out from the input buffer 61A, detects the tail of the first audio video data block forming the audio video data D60 and detects VITC time code showing said block tail. With this arrangement, the CPU 61D detects VITC time code showing the head of the first audio video data block forming the audio video data D60 and the VITC time code showing the block tail.

Then, the CPU 61D obtains the VITC time code added to the head frame of the succeeding block of the audio video data D60, and as well as storing this in the time code register 61C, sets this in the internal time code counter. Then, conducting the similar comparison processing, the CPU 61D obtains VITC time code showing the tail of the following audio video data block. And by repeating this processing in order, the CPU 61D detects the head and the tail of VITC time code of each audio video data block comprising the audio video data D60.

Furthermore, in tandem with the detection processing of VITC time code s of the block he ad and the block tail, the CPU 61D conduct s the allocation processing of server record time codes to the audio video data D60. More specifically, firstly, the CPU 61D set s the value of the time code counter for STC provided inside to the predetermined value and by reset ting the value of time code counter for FTC, sets to (00:00:00:00). In this connection, as the predetermined value to be set to the time code counter for STC, any optional value may be acceptable provided that the value shows the record start time, e.g., the value of standard time code prepared in the broadcasting station is used. Then, the CPU 61D successively increments the value of time code counter for FTC based on the clock signal S71 supplied from the readout clock generator 61B, and successively assigned the FTC value shown by the time code counter for FTC and the STC value shown by the time code counter for STC to each frame of the audio video data D60. More specifically, the CPU 61D assigns the predetermined value initially set as the STC value to the first frame of the audio video data D60 put in the input buffer 61A and assigns (00:00:00:00) as the FTC value, and to the following frame, assigns the same STC value and the FTC value formed of (00:00:00:01). Thus, the CPU 61D assigns new server record time codes continuing in the file to the audio video data D60 to be recorded as the same file. The CPU 61D transmits this newly allocated server record time code to the server storage 64 as time code D66.

The CPU 61D arranges the relationship between the server record time code newly assigned (STC and FTC) and the VITC time codes already added to the audio video data D60 per block by using thus detected VITC time codes of the head and tail of each block, and forms a table in which newly assigned server record time codes and the VITC time codes already added are tabulated, and stores this in the time code management table storing unit 61E as a time code table information D74.

The time code management table storing unit 61E (e.q., a memory) and transmits the time code table information D74 stored by the processing of the CPU 61D to the server management system 63 as the file information D62 as described above. Similarly, the image index storing unit 61F (e.q., a memory) and outputs the image index information D73 stored by the processing of the CPU 61D to the server management system 63 as the file information D62. Thus, this image index storing unit 61F can transmit the file information D62 formed of the image index information and the time code table to the system control unit 26 via the server management system 63 and said file information D62 can be referred commonly at each device of the news program production broadcasting system 20.

Figure 4:
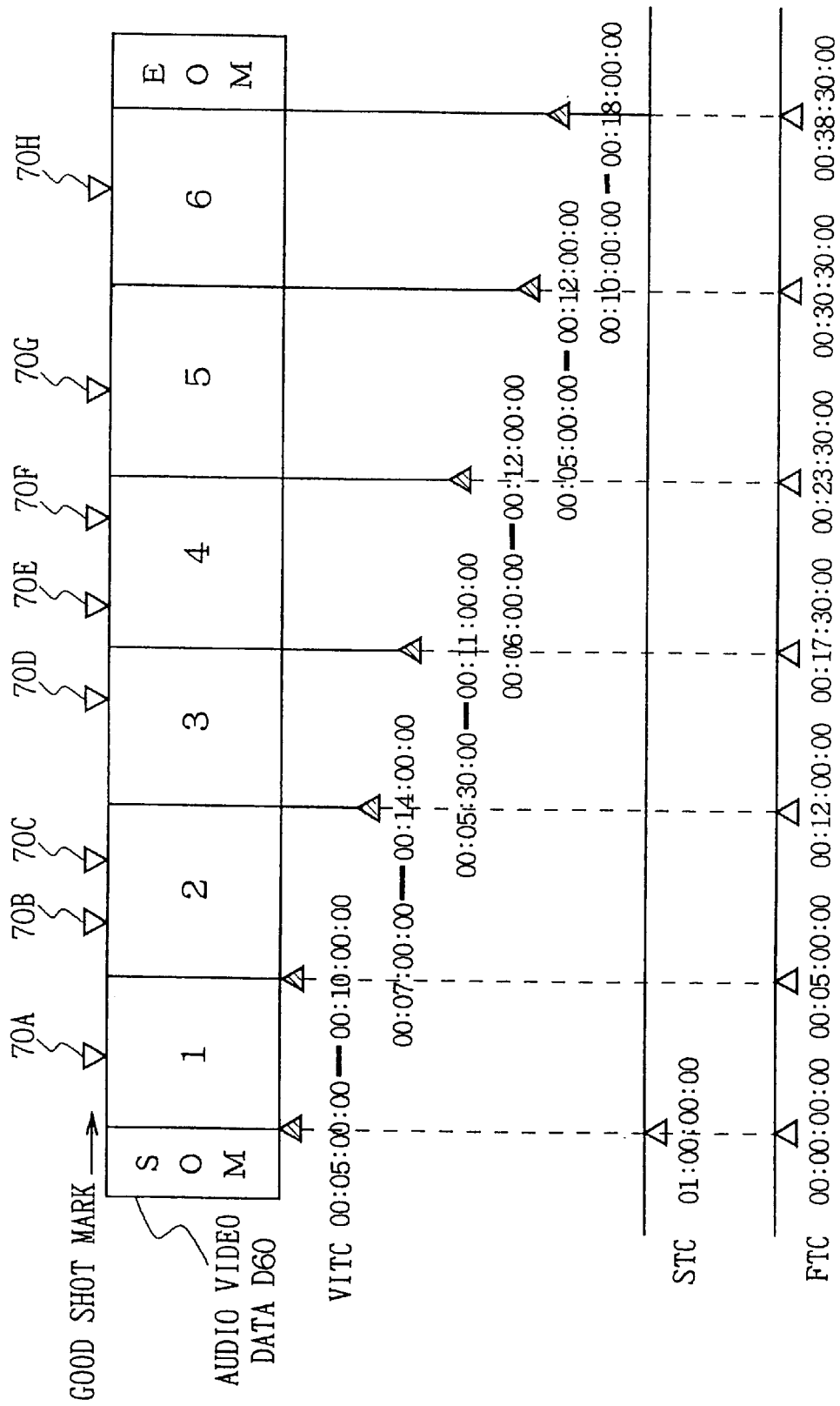
FIG. 4 is a schematic diagram illustrating the relationship between the construction of audio/video data and time codes.

At this point, the image index information detection processing and the time code table forming procesing will be explained showing concrete examples in the following paragraphs. As shown in FIG. 4, the audio video data D60 is comprised of such as 6 audio video data blocks, and assume that VITC time codes from (00:05:00:00) to (00:10:00:00) are added to the first block as the real time codes, and to the second block, VITC time codes from (00:07:00:00) to (00:14:00:00) are added as the real time codes. Similarly, assume that VITC time codes from (00:05:30:00) to (00:11:00:00), VITC time codes from (00:06:00:00) to (00:12: 00:00), the VITC time codes from (00:05:00:00) to (00:12:00:00) and VITC time codes from (00:10:00:00) to (00:18:00:00) are added to the third block through the sixth block respectively.

Furthermore, assume that index data such as the date of photo shooting, the model name of camcorder, the serial number of camcorder, cassette number, the location of photo shooting are added to the audio video data of each block and also the good shot mark data are attached. In FIG. 4, arrow marks 70A–70H show the frame positions on which good shot marks are attached. Moreover, the start of media (SOM) added to the head of the audio video data D60 is an information showing the head of data stream formed of multiple blocks, and the end of media (EOM) added to the tail of the audio video data D60 is an information showing the end of data stream formed of multiple blocks.

When such audio video data D60 is entered into the input buffer 61A, the CPU 61D extracts material information from said audio video data D60 in order and stores the index data and the data of good shot mark in the image index storing unit 61F as the image index information D73. At this point, arranging data per block respectively, the CPU 61D forms a table shown in FIG. 5 (A) or FIG. 5 (B) and stores this in the image index storing unit 61F. In this connection, the table shown in FIG. 5 (A) is an index table on which the date of photo shooting, the model name, serial number, cassette number and the location of photo shooting are arranged per block. The table shown in FIG. 5 (B) is a good shot mark table showing frames on which good shot marks are added by the VITC time codes and these are arranged per block.

Furthermore, when the audio video data D60 is entered into the input buffer 61A, the CPU 61D extracts VITC time codes from said audio video data D60 in order and detects VITC time codes of the head and tail of each block. Moreover, the CPU 61D assigned STC to show the head position of the file, and FTC to show relative position from the head of the file to each frame of the audio video data D60 in order as new server record time codes. For example, as shown in FIG. 4, it assigns the time codes formed of (01:00:00:00) as the STC and it assigns continuous time codes starting from (00:00:00:00) to each frame as the FTC. And then, as shown in FIG. 6, by using the VITC time codes of the head and tail of each block detected, the CPU 61D forms a time code management table showing the relationship between newly assigned server record time codes (STC, FTC) and the VITC time codes already attached to the audio video data D60, and stores this in the time code management table storing unit 61E as the time code table information D74. As shown in this FIG. 6, the time code management table is arranged per block and shown by the STC and FTC assigned to the head of block, duration showing the length from the head to the end of the block (Dur), and VITC time code (S-VITC) added to the head of the block and (E-VITC) added to the end of the block. By forming such time code management table at the time when editing, if the position of frame is specified by the VITC time code actually added to the audio video data D60, the server record time code newly assigned for recording management in the daily server 30 can be specified, by referring to this time code management table, and it becomes possible to reproduce the audio video data D60 of the frame position specified by VITC time code from the daily server 30.

Figure 7:
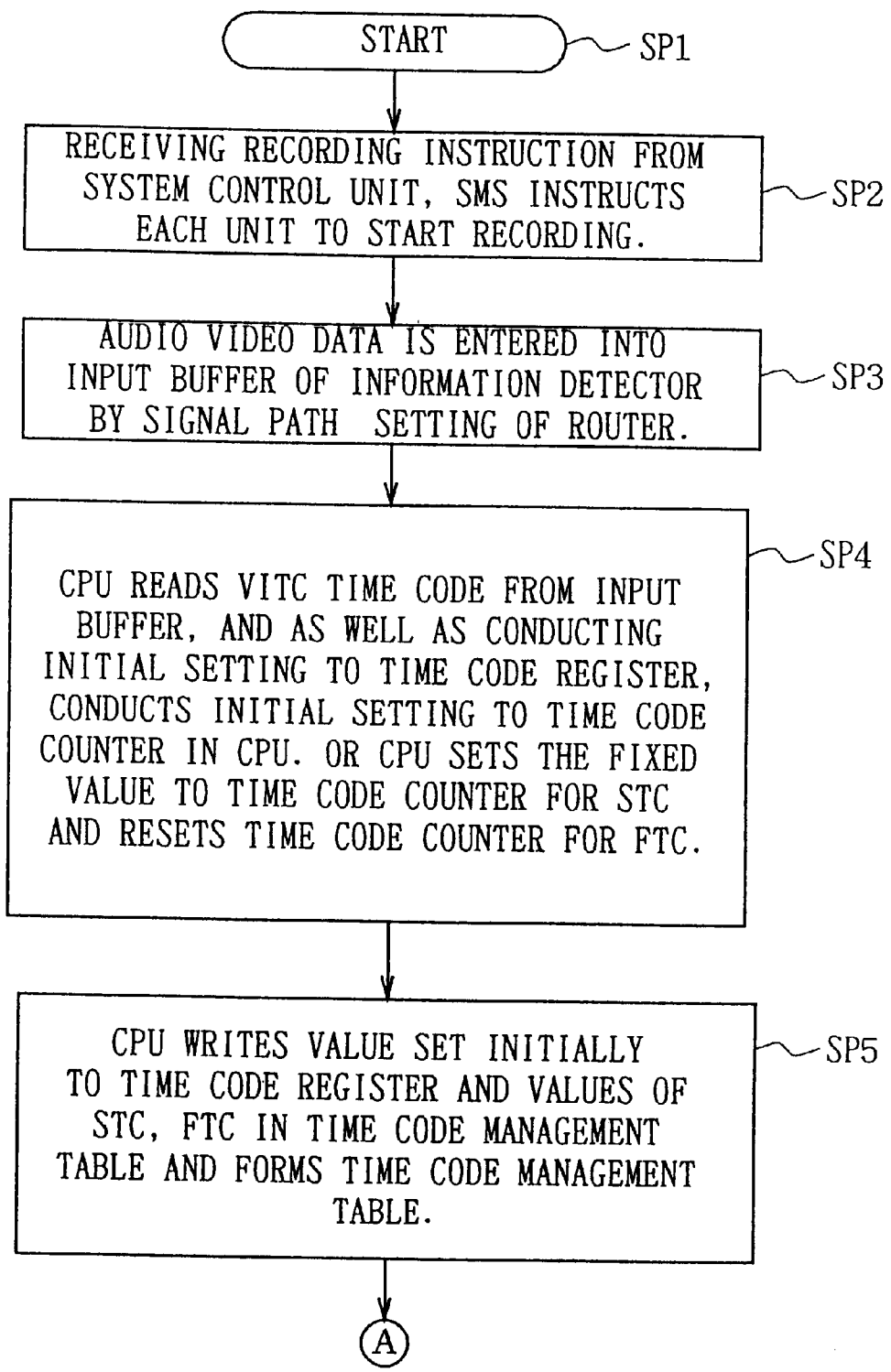
FIG. 7 is a flow chart showing the time code management table forming processing and the image index information detection processing.
Figure 8:
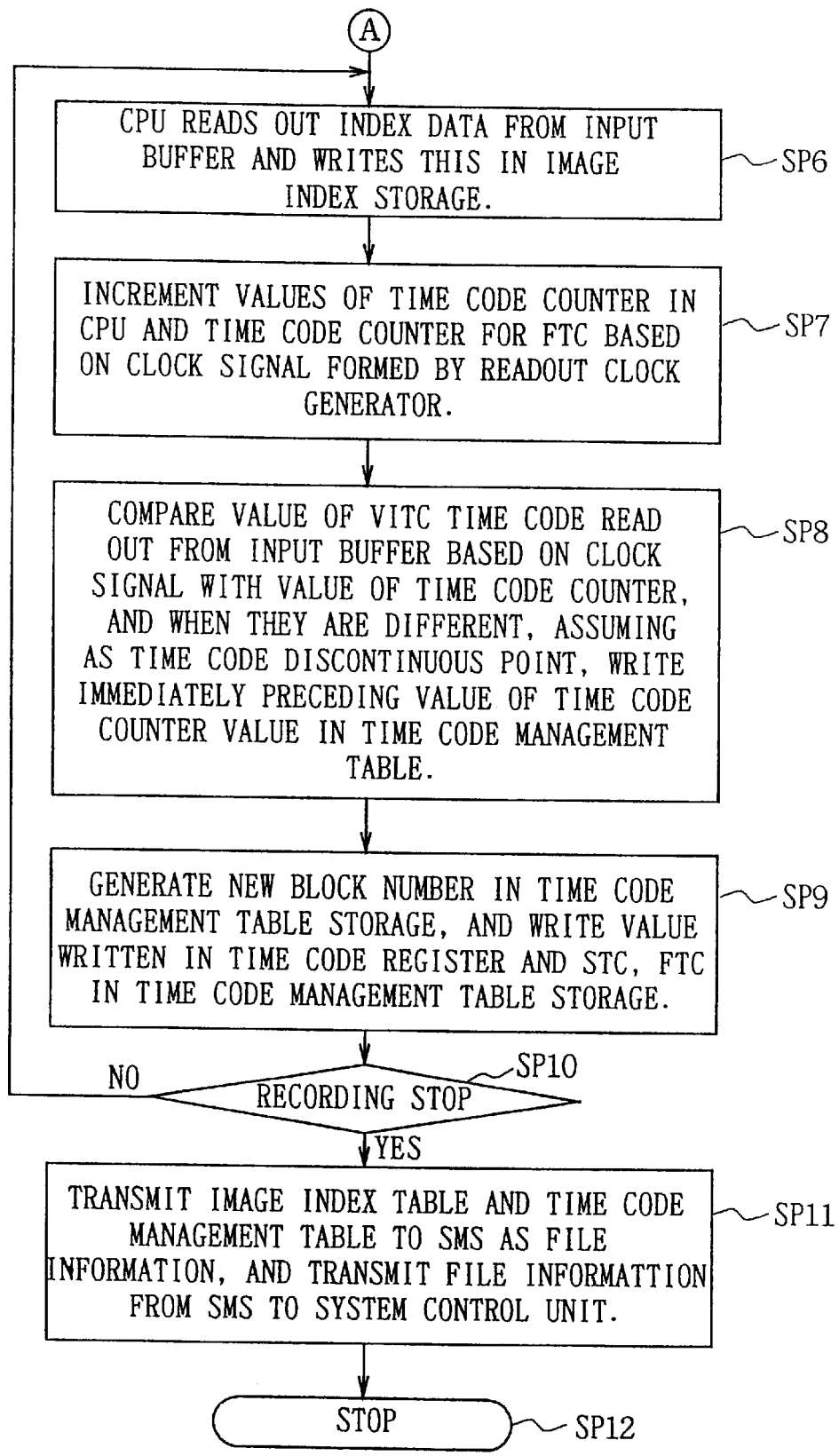
FIG. 8 is a flow chart showing the time code management table forming processing and the image index information detection processing combined with FIG. 7.

At this point, the image index information detection procedure and the time code management table forming procedure will be described referring to flow charts shown in FIGS. 7 and 8. Firstly, at step SP2 entered from the step SP1, the audio video data D60 recording instruction from the system control unit 26 is received and the server management system 63 instructs the record start to each unit in the daily server 30. Then next, at the step SP3, a signal route is set by the router 60 and the audio video data D60 to be recorded will be entered into the input buffer 61A of the information detector 61 in sequence.

At the following step SP4, the CPU 61D of the information detector 61 assigns new time code to the audio video data D60.

More specifically, the CPU 61D reads VIT time code added to the head frame of the audio video data D60 from the input buffer 61A, and as well as setting that value to the time code register 61C as an initial value, sets that value to the time code counter in the CPU 61D. Moreover, the CPU 61D sets the predetermined value that shows the recording start time to the time code counter for STC in the CPU 61D and resets the time code counter for FTC.

At the following step SP5, the CPU 61D stores the initially set value of the VITC time code and values of STC and FTC to the time code register 51 in the time code management table storing unit 61E, and starts to make a time code management table. At the following step SP6, the CPU 61D reads the index data such as the date of photo shooting and the model name, and good shot mark data from the input buffer 61A and writes these in the image index storing unit 61F as an image index information D73. In this case as described above, each data is arranged per block and the index table and good shot mark table will be formed and these will be stored in the image index storing unit 61F.

At the following step SP7, the CPU 61D increments values of the time code counter in said CPU 61D and the time code counter for FTC based on the clock signal S71 showing frame timing formed in the readout clock generator 61B. Then, at the following step SP8, the CPU 61D compares the value of VITC time code read out from the input buffer 61A with the value of time code counter based on the clock signal S71, and if these values are different, assuming that it is a discontinuous point of time code (i.e., block of the audio video data is shifted), stored the value immediately preceding the value of time code counter in the time code management table storing unit 61F as the VITC time code of the tail of block and forms a time code management table on that block. Moreover, the CPU 61D stores the VITC time code read out from the input buffer 61A in the time code register 61C newly as the head time code of the succeeding video audio data block.

At the following step SP9, the CPU 61D generates new block numbers in the time code management table storing unit 61F, and after storing the value of the VITC time code written in the time code register 61C and values of the STC and FTC in said time code management table 61F, starts to form the time code management table on the following block. At the following step SP10, the CPU 61D judges whether the recording is terminated or not, and if the recording has not been finished, returning to the step SP6, it repeats the processing, and if the recording is completed, it moves to the following step SP11. With this arrangement, the CPU 61D, arranging the relationship between the image index information and time code per block of the audio video data D60, forms the image index table and the time code management table.

At the following step SP11, the image index storing unit 61F and the time code management table storing unit 61E transmit the image index table and the time code management table to the server management system 63 as the file information D62, and the file information D62 is transmitted from the server management system 63 to the system control unit 26. When this processing is completed, moving to the following step SP12, the processing is terminated. According to the above processing, the image index table shown in FIG. 5 and the time code management table shown in FIG. 6 are transmitted to the system control unit 26 and stored in the external memory device 35 connected to said system control unit 26. Thus, in this news program production broadcasting system 20, these table information can be referred as control information when editing.

(3) EDITING DEVICE

In this chapter an editing device 42 for conducting the editing processing by manual operation will be described. In the editing device 42, the desired video material and audio material will be read out by accessing the daily server 30, and by editing processing these, the program for broadcasting can be formed. This editing device 42 comprises a monitor (now shown in Fig.) as a display means, and conducts the editing processing by operating the graphical user interface (hereinafter referred to as GUI) to be displayed on said monitor. Moreover, in this editing device 42, reading out the video material to be used in the program from the daily server 30, the video material can be displayed and the editing work can be conducted by confirming said video material.

Figure 9:
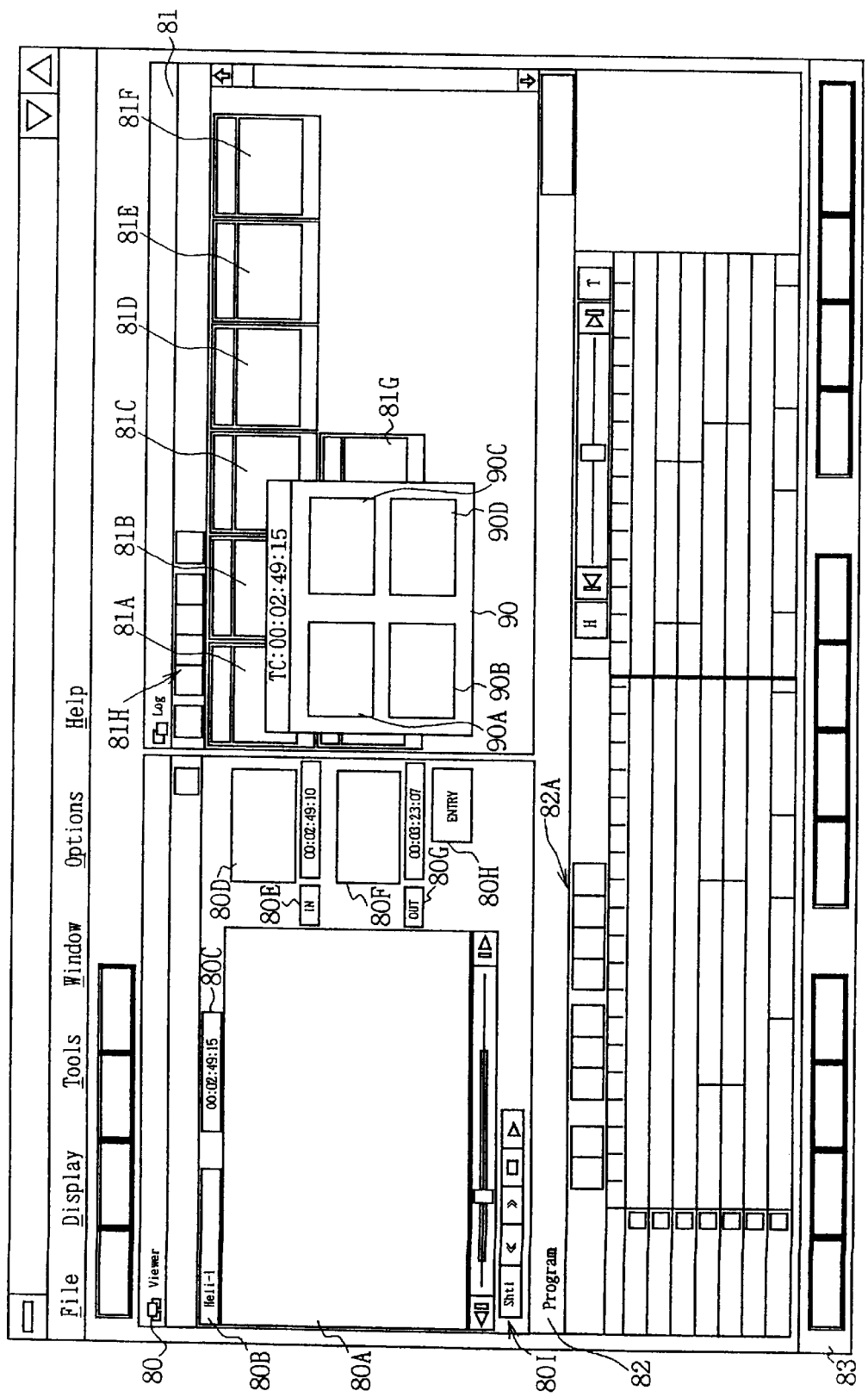
FIG. 9 is a schematic diagram showing a display screen of the editing device.

At this point, the display screen to be shown on the monitor of this editing device 42 will be shown in FIG. 9. As shown in this FIG. 9, the display screen of the editing device 42 roughly consists of a viewer window 80 and a log window 81, a program window 82 and a command area 83. The viewer window 80 is an area for forming an event by cutting off the desired part from the material by specifying the in-point and out-point as well as displaying images of the material, and this viewer window 80 comprises a material display area 80A, a file name display area 80B, a time code display area 80C, an in-point image display area 80D, an in-point button 80E, an out-point image display area 80F, an out-point button 80G, an entry button 80H and a command button area 80I.

In the viewer window 80, when a play button of the command button area 80I is clicked by the mouse, the material image of the file displayed on the file name display area 80B will be displayed on the material display area 80A. At this point, by clicking the time code display area 80C, the desired real time code (in this case it is VITC time code added to the material) is entered, frame video signal of the specified real time code can be read out and its image can be displayed on the material display area 80A. In this case, the editing device 42, referring to the time code management table stored in the external memory device 35 of the system control unit 26 as described above, detects the server record time code (STC, FTC) of the frame specified by the real time code, and using said server record time code, accesses the daily server 30 and calls up the frame video signal specified.

Furthermore, in that case if the plural number of frames of the real time code specified exist in the same file, the editing device 42 also detects the server record time code of the frame concerned referring to the time code management table and reads out each frame video signal from the daily server 30. And as shown in FIG. 9, it opens the same time code display area 90 on the display screen and displays each frame video signal 90A–90D read out in said display area 90 scaled down (hereinafter this scaled down display of the frame video signal is referred to as stamped picture). Thus, the operator can know that there exist multiple frames of the real time code specified in the file. Under this condition, if the desired stamped picture 90A–90D is clicked, frame video signal of the stamped picture specified will be displayed on the material display area 80A. Accordingly, in the case where frames having the same real time code exist in the same file, the operator can display the desired material on the material display area 80A by a simple operation.

Then, the log window 81 is an area for specifying in-point and out-point by accessing an in-point button 80E and an out-point button 80G of the viewer window 80 and for storing events cut out by clicking an entry button 80H. In this log window 81, in order to show the event cut out, clipped images 81A–81G of the in-point and out-point of the event will be displayed. Moreover, of command button area 81H provided in this log window 81, if the predetermined command button is clicked, stamped pictures of the frame on which good shot marks are added will be displayed in a line in the same manner as the clipped images 81A–81G. In this case, the editing device 41, referring to the good shot mark table memorized in the external memory device 35 of the system control unit 26 as described above, detects server record time code (STC, FTC) to which good shot mark is added, and accessing the daily server 30 in utilizing said server record time code, reads out the frame video signal on which good shot mark is added and displays stamped picture.

In this connection, in the case of displaying the stamped picture of the frame on which good shot mark is added, real time code of that frame will be displayed with said stamped picture. Thus, the content of the frame on which good shot mark is added can be confirmed and simultaneously, knowing the real time code of that frame, its image can be displayed on the material display area 80A, and editing can be conducted making the good shot mark as a guide.

Then, the program window 82 is an area for specifying the program for broadcasting by taking out the desired event from the events stored in the log window 81 and sorting these in the desired order and by instructing the special effect processing to the desired event. This program window 82 is a virtual space, and the actual editing processing cannot be conducted when events are placed in a line in this area, but the editing processing can be executed only when a command of editing processing execution is entered by clicking the predetermined command button in this command area 83.

The command area 83 is an area in which various kinds of commands relating to the editing processing are placed. In this editing device 42, by clicking various kinds of command buttons prepared in this command area 83 by the mouse, various editing processing commands can be entered. In this connection, commands relating to the exclusive processing to be conducted in each window 80, 81 and 82 are prepared in the command button areas 80I, 80H, 82A provided in the windows 80, 81 and 82 respectively.

Figure 10:
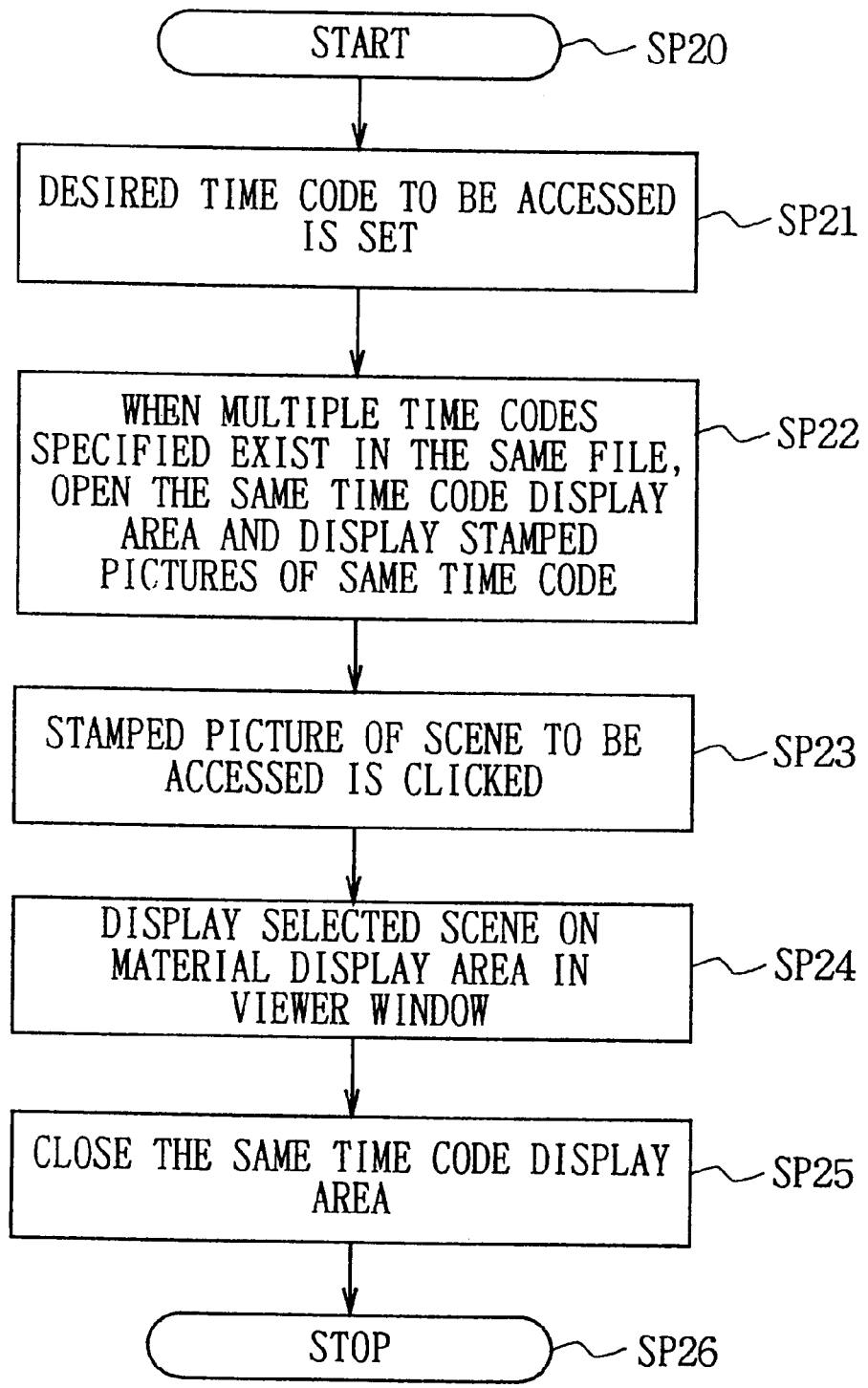
FIG. 10 is a flow chart showing the processing procedure when the same real time codes exist in the same file.

At this point, the processing procedure in the case of opening the same time code display area 90 and displaying the stamped picture having the same real time code will be explained referring to the flow chart in FIG. 10. In this case, at the step SP21 entered from the step SP20, if the real time code to which the operator wants to access is set, the editing device 42 moves to the following step SP22. The editing device 42 judges whether the plural number of real time codes specified exist in the file to be accessed or not. And in the case where there exist multiple real time codes in the same file, the editing device 42, as well as obtaining all stamped pictures having the specified real time code by accessing the daily server 30, displays these stamped pictures upon opening the same time code display area 90.

Then, at the next step SP23, if the stamped picture of the scene that the operator wants to access is clicked, the editing device 42 moves to the next step SP24. At the step SP24, it reads out the stamped picture image specified by clicking from the daily server 30, and displays this on the material display area 80A in the viewer window 80. Then, moving to the following step, it closes the same time code display area 90 and terminates the processing moving to the next step SP26. By displaying the stamped pictures having the same real time code conducting said processing procedure, the operator can specify easily the material that he wants to see, and the editing work can be conducted efficiently.

(4) OPERATION AND EFFECTS

According to the foregoing construction, in this news program production broadcasting system 20, audio video data obtained by photo shooting on the field are recorded in the daily server 30, and the program for broadcasting will be produced by conducting the editing processing using various video materials and audio materials stored in said daily server 30. And in the daily server 30, when recording the audio video data, multiple audio video data recorded at the same field are recorded in a combined file. In this case, in order that these multiple audio video data can be controlled by the time code, the daily server 30 allocates new server record time codes (STC, FTC) to said audio video data and records. However, if these new server recording time codes were allocated and recorded, the material cannot be read out by the real time code showing real time added when recorded by the camcorder.

Then, this daily server 30 detects the real time code added when recorded by the camcorder (here it is VITC time code) from the audio video data D60 (or D61), and forms a time code management table showing the relationship between said real time code and newly allocated server record time code (STC, FTC), and transmitting this, stores in the external memory device 85 of the system control unit 26. In the editing device 42, if such time code management table is stored in the external memory device 35, referring to that time code management table, the relationship between the real time code and newly allocated server record time code can be known. Accordingly, in the editing device 42, even in the case where the material specification is done by the real time code from the operator, the server record time code can be detected by the time code management table, and the material specified by the real time code can be read out easily from the daily server 30. Accordingly, in this news program production broadcasting system 20, by forming the table showing the relationship between the server record time code allocated when recording onto the daily server 30 and the real time code added when recorded by the camcorder and memorizing this in the commonly accessible external recording device 35, the material can be read out from the daily server 30 by the specification of the real time code, and the operability at the time of editing can be improved.

Moreover, since in the case where the same time codes exist in the file to be accessed when the material is specified by real time codes, stamped pictures having the same time code are displayed on the screen of the editing device 42 respectively, even in the case where the plural number of same time codes exist, the operator can easily specify the material that he wants to access and editing operation can be efficiently conducted.

Furthermore, since the good shot mark data added when recorded by the camcorder is detected from the audio video data D60 (or D61), and a good shot mark table showing the real time code of the frame to which said good shot mark is added is formed and this is to be stored in the external memory device 35 of the system control unit 26, stamped pictures of the frame to which good shot marks are added can be displayed on the screen of the editing device 42 referring to said good shot mark table, and thereby, the editing operation can be conducted making the good shot mark added when photographed as an index and the operability at the time of photo shooting can be improved.

Furthermore, the index data such as the date of photo shooting added when photographed, the model name of camcorder, the serial number, the cassette number, the place of photo shooting are detected from the audio video data D60 (or D61), and since these are memorized in the external memory device 35 of the system control unit 26 as an index table, it becomes unnecessary for the operator to enter the index data as before and the operator's time and effort can be further saved.

Accordingly, since in the news program production broadcasting system 20, when recording the audio video data D60 (or D61), the material information added to the material such as real time code, good shot mark data and index data are detected and based on that detection result, the predetermined control information such as a time code management table, a good shot mark table and an index table are formed and these are memorized in the external memory device 35 which is accessible from each device, the control information on the material can be set easily without operator's input, and thereby the usability at the time of editing can be improved.

According to the foregoing construction, since the material information added to the material is detected from the audio video data D60 (or D61) and based on that detection result, the predetermined control information is formed and memorized in the external memory device 35, control information regarding the material can be set easily and simultaneously the editing processing based on said control information can be conducted, and thus the usability at the time of editing can be improved.

(5) OTHER EMBODIMENTS

The embodiment described above has dealt with the case of detecting the material information such as real time code, goodshot mark data, or index data from the audio video data D60 (or D61) in the daily server 30 and forming a table from these data and storing this in the external memory device 35. However, the present invention is not only limited to these but also the material information may be detected from the high compression coded data D12 in the clip server 33 and forming similar various kinds of tables based on said material information, these may be stored in the external memory device 35 as control information. With this arrangement, in the EDL forming device 34A–34N, materials can be specified by the real time codes referring to the control information, and at the same time the stamped pictures of the frames to which the same real time codes are added can be displayed, and thus, the operability at the time when forming the EDL can be further improved.

Figure 11:
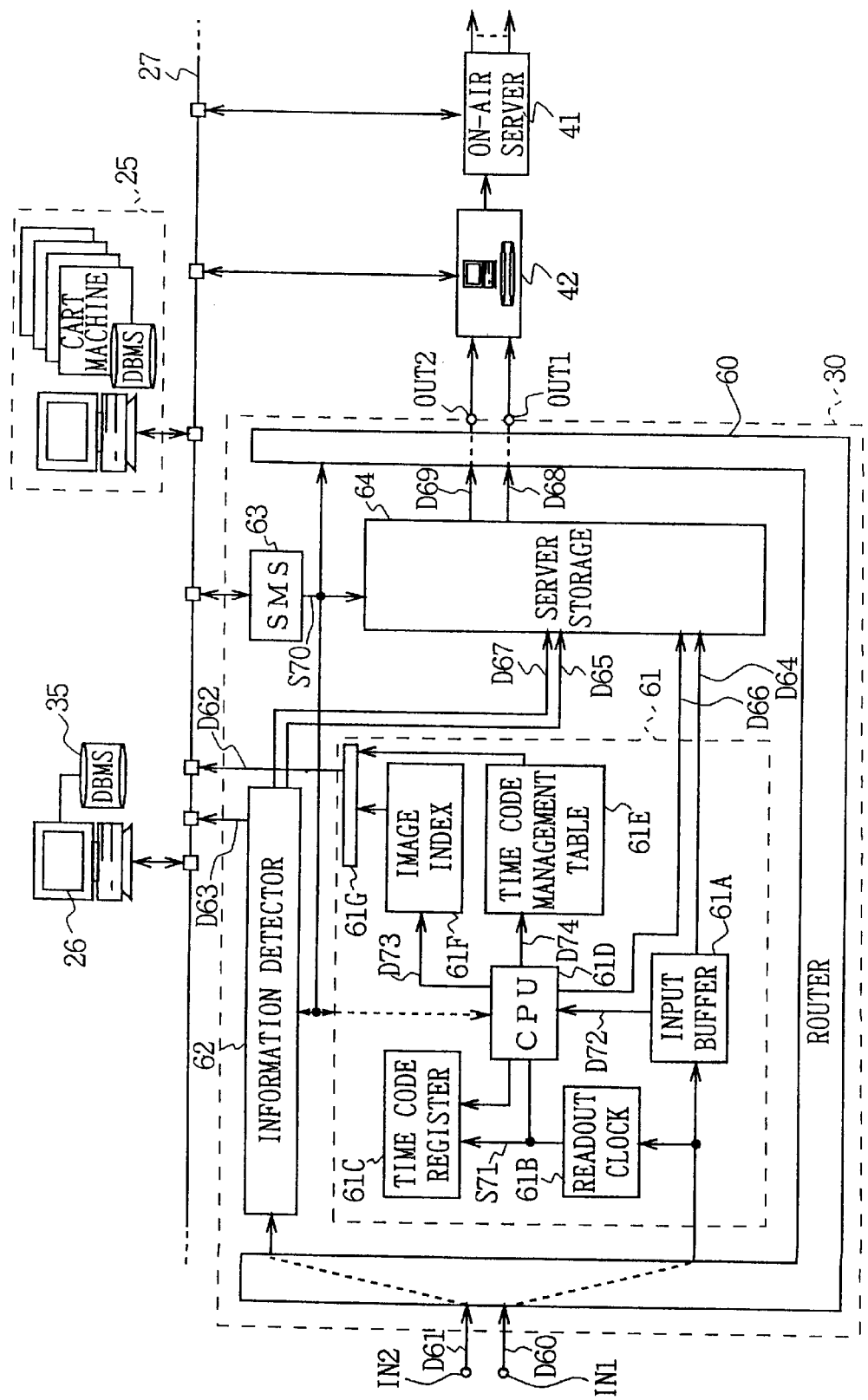
FIG. 11 is a block diagram showing the other construction of the daily server.

Furthermore, the embodiment described above has dealt with the case of transmitting the file information D62 (or D63) formed of the time code table information D74 and the image index information D73 to the system control unit 26 via the server management system 63 and storing this in the external memory device 35 connected to the system control unit 26. However, the present invention is not only limited to this but also, as shown in FIG. 11, providing a buffer 61G for receiving the image index information D73 and the time code table information D74 in the information detector 61 (or 62), file information D61 (or D63) formed of image index information D73 and time code table information D74 may be transmitted to the system control unit 26 via said buffer 61G. With this arrangement, the processing load of the server management system 63 can be decreased.

Furthermore, the embodiment described above has dealt with the case of dealing with the audio and video simultaneously as the audio/video data. However, the present invention is not only limited to this but also either one of these, audio or video may be dealt with.

Moreover, the embodiment described above has dealt with the case of applying the present invention to the news program production broadcasting system for producing the broadcasting program by editing processing various kinds of video materials and audio materials which are stored in the daily server 30. However, the present invention is not only limited to this but also the present invention can be widely applicable to the video signal processing device provided that the video signal processing device is the device which records video signal as the material by the predetermined recording reproducing means, and reading out the video signal recorded in said recording reproducing means, applies the desired editing processing. In short, in the case of recording the video signal by the recording reproducing means in the video signal processing device, if a detecting means for detecting the material information from said video signal and forming the predetermined control information based on the detection result, and a memory means for memorizing that control information would be provided, the same effects as those of the above can be obtained.

POSSIBLE APPLICATION IN THE INDUSTRIAL FIELD

The video signal processing device according to the present invention can be utilized in the news program production system, and by downloading the video signal collected on the field as material information to the server device of the broadcasting station, in the case of recording onto the recording reproducing means of said server device, it detects the material information added to said video signal and forming the predetermined control information, records this control information formed on the video signal.

What is claimed is:

1. A video signal processing device for recording on and reproducing from a medium video signals which contain material information added during an initial recording, reading out the recorded video signals from said device and editing the video signals during a reproducing operation, comprising:

detection means for detecting the material information that had been added to said video signals during an initial recording and for producing control information comprising new time codes designated during a recording/reproducing operation;

memory means for storing said control information produced by said detection means in a table along with said detected material information corresponding thereto; and display means for displaying content indicative of said detected material information, and for reading out and displaying at least one video signal frame by referring to said table upon a selection of said displayed content.

2. A video signal processing device according to claim 1, wherein the material information includes photo shooting time codes added to the video signals during an initial recording; and wherein said detection means includes means for detecting said photo shooting time codes, and means for producing said control information in a table in which said photo shooting time codes correspond to said new time codes designated during the recording reproducing operation.

3. A video signal processing device according to claim 2, wherein said displayed content comprises a photo shooting time code, and said display means reads out and displays video signal frames of a specified photo shooting time code by specifying a particular photo shooting time code that is recognized as corresponding to said new time code.

4. A video signal processing device according to claim 3, wherein a multiple number of video signal frames correspond to a specified photo shooting time code; and wherein said display means includes means for reading out from said medium, multiple video signals which correspond to the specified photo shooting time code; and means for displaying a reduced version of each of the multiple video signals having said specified photo shooting time code, and for displaying the video signal of the photo shooting time code specified by the user from among the reduced versions of each of the multiple video signals.

5. A video signal processing device for recording on and reproducing from a medium video signals which contain material information added during an initial recording, reading out the recorded video signals from said device and editing the video signals during a reproducing operation, comprising:

detection means for detecting the material information that had been added to said video signals during an initial recording and for producing control information corresponding to said material information during a recording/reproducing operation; and memory means for storing said control information produced by said detection means to enable editing of initially recorded video signals by indicating the corresponding material information;

wherein the material information includes good shot indications added to the video signals during initial recording thereof representing frames of the video signals deemed by a cameraman to be usable for broadcasting; and wherein said detection means includes means for detecting said good shot indications and means for producing control information identifying the time code of the frame of the video signal to which said good shot indication has been added.

6. A video signal processing device according to claim 5, further comprising:

display means for reading out the frame of the video signal to which said good shot indication has been added and for displaying said read out video signal.

7. A video signal processing device for recording on and reproducing from a medium video signals which contain material information added during an initial recording, reading out the recorded video signals from said device and editing the video signals during a reproducing operation, comprising:

detection means for detecting the material information that had been added to said video signals during an initial recording and for producing control information corresponding to said material information during a recording/reproducing operation; and memory means for storing said control information produced by said detection means to enable editing of initially recorded video signals by indicating the corresponding material information;

wherein the material information includes index data added to the video signals during initial recording thereof, said index data including at least one of: a photo shooting date; model information of a camera that generated the video signals; a storage medium number; and a photo shooting location; and wherein said detection means includes means for detecting said index data and means for producing control information identifying the time code of the frame of the video signal to which said index data has been added.

* * * * *